(12) United States Patent
Hosoda et al.

(10) Patent No.: US 7,649,331 B2
(45) Date of Patent: Jan. 19, 2010

(54) MOBILE ROBOT (75) Inventors: Yuji Hosoda, Kasumigaura (JP); Saku Egawa, Toride (JP); Junichi Tamamoto, Kasumigaura (JP); Ryosuke Nakamura, Hitachinaka (JP); Toshihiko Horiuchi, Abiko (JP)

(73) Assignee: Hitachi, Ltd., Tokyo (JP)

( * ) Notice: Subject to any disclaimer, the term of this patent is extended or adjusted under 35 U.S.C. 154(b) by 826 days.

(21) Appl. No.: 11/270,599

(22) Filed: Nov. 10, 2005

(65) Prior Publication Data
US 2006/0097683 A1 May 11, 2006

(30) Foreign Application Priority Data
Nov. 11, 2004 (JP) ............................. 2004-327451

(51) Int. Cl.
*B25J 5/00* (2006.01)
*B25J 19/02* (2006.01)
(52) U.S. Cl. .................... 318/568.12; 318/568.16; 901/1
(58) Field of Classification Search ............ 318/568.12, 318/568.16, 568.18, 568.22; 700/245–264; 901/1; 180/8.3
See application file for complete search history.

(56) References Cited

U.S. PATENT DOCUMENTS

| 4,657,104 | A  | * | 4/1987  | Holland        | 180/211   |
|-----------|----|---|---------|----------------|-----------|
| 5,158,493 | A  | * | 10/1992 | Morgrey        | 446/355   |
| 5,416,393 | A  | * | 5/1995  | Gomi et al.    | 318/568.2 |
| 5,459,659 | A  | * | 10/1995 | Takenaka       | 700/260   |
| 6,564,888 | B1 | * | 5/2003  | Gomi et al.    | 180/8.6   |
| 6,915,878 | B2 | * | 7/2005  | Kamen et al.   | 182/141   |
| 6,948,576 | B2 | * | 9/2005  | Angeles        | 180/23    |
| 6,963,185 | B2 | * | 11/2005 | Takenaka et al.| 318/568.12|
| 2004/0015266 | A1 | * | 1/2004  | Skoog       | 700/245   |
| 2005/0228539 | A1 | * | 10/2005 | Takenaka et al. | 700/245 |
| 2006/0111814 | A1 | * | 5/2006  | Hachitani et al.| 700/258 |
| 2006/0243499 | A1 | * | 11/2006 | Hosoda      | 180/8.5   |
| 2007/0260355 | A1 | * | 11/2007 | Morimoto et al. | 700/245 |
| 2008/0135312 | A1 | * | 6/2008  | Nakamura et al. | 180/8.3 |

(Continued)

FOREIGN PATENT DOCUMENTS

JP     63-305082     12/1988

(Continued)

OTHER PUBLICATIONS

Kanoh, Adaptive Control of Inverted Pendulum, Computrol, vol. 2, pp. 65-75 [ Japanese Language] / 14 Pages [ English Translation] (1983).*

(Continued)

*Primary Examiner*—Walter Benson
*Assistant Examiner*—Eduardo Colon-Santana
(74) *Attorney, Agent, or Firm*—Antonelli, Terry, Stout & Kraus, LLP.

(57) ABSTRACT

A mobile robot has a mobile mechanism, a swing mechanism and a control unit. The mobile mechanism is of a coaxial two-wheeled type and controls a forward thrust using inverted pendulum control. The swing mechanism actively swings an upper body laterally with respect to the mobile mechanism. A centrifugal force and a gravitational force act on a center of gravity of the mobile robot. A swing attitude is controlled such that a location of intersection of an extension of a composite vector of the forces acting on the center of gravity of the mobile robot and a ground plane of wheels is kept between left and right wheels.

8 Claims, 7 Drawing Sheets

U.S. PATENT DOCUMENTS

2008/0173493 A1* 7/2008 Adachi .................. 180/218
2008/0265821 A1* 10/2008 Theobald .............. 318/568.12

FOREIGN PATENT DOCUMENTS

| JP | 01-316810 | 12/1989 |
| JP | 05-305579 | 11/1993 |
| JP | 2001138272 A * | 5/2001 |
| JP | 2003-271243 | 9/2003 |
| JP | 2004-74814 | 3/2004 |
| JP | 2004-078785 | 3/2004 |
| JP | 2005288561 A * | 10/2005 |

OTHER PUBLICATIONS

Kawaji, "Stabilization of Unicycle Using Spining Motion" (English Translation), Denki Gakkai Ronbushi. D, vol. 107-D, Issue No. 1, pp. 1-23, Japan (Jan. 1987).*

* cited by examiner

$P(t)=[x(t), y(t), V(t), \zeta(t), \kappa(t)]$

MOBILE ROBOT

CLAIM OF PRIORITY

The present application claims priority from Japanese application JP 2004-327451 filed on Nov. 11, 2004, the content of which is hereby incorporated by reference into this application.

BACKGROUND OF THE INVENTION

The present invention relates to a mobile robot and a control method therefor. More particularly, it relates to a mobile robot to operate in an environment shared by human beings and a control method therefor.

For a robot to operate in an environment shared by human beings, it is ideal for the robot to be as tall as human beings so as to efficiently carry out manual operation to assist human workers or operate interactively with them. In a case in which a robot is required to efficiently carry out operation which involves traveling in a space where human beings are also present, it is desirable to minimize the footprint (flat projected area) of the robot. When such requirements for the shape of a robot are met, the center of gravity of the robot inevitably becomes higher relative to the footprint and the robot becomes less stable in its standing position. On the other hand, when a robot is to be put in practical use, it is required to be capable of traveling quickly and safely. This requirement is not compatible with the higher center of gravity of a robot described above.

In view of the requirement, robots provided with a coaxial two-wheeled mechanism and using inverted pendulum control to control a forward thrust have been proposed as disclosed in, for example, Japanese Patent Laid-Open No. S63 (1988)-305082, Japanese Patent Laid-Open No. 2003-271243, and Japanese Patent Laid-Open No. 2004-74814.

The patent document 1 describes a method for controlling the attitude of a coaxial two-wheeled vehicle having a vehicle body rotatably supported on an axle which is, at its ends, provided with a pair of wheels, a wheel driving motor attached to the vehicle body, a control computer to send operation commands to the wheel driving motor, and an angle detecting means for detecting an inclination of the vehicle body. In the method: the angle detection means detects the angle of inclination of the vehicle body; the angle of inclination of the vehicle body detected is sampled at short intervals; a controlling torque of the wheel driving motor is determined based on calculation made by substituting the sampled inclination angle as a state variable and a feedback gain as a coefficient into a control input calculation formula preset in the control computer; and the control computer sends a command for operation equivalent to the control torque thus determined to the wheel driving motor to control the attitude of the coaxial two-wheeled vehicle.

The Japanese Patent Laid-Open No. 2003-271243 discloses a communication robot including an upper body mechanism which has plural axles and which is installed on a carriage. The communication robot is also provided with substantially one axle, two wheels attached to the axle to be apart from each other, and a control means which controls the rotation of the wheels according to the state of the upper body mechanism.

The Japanese Patent Laid-Open No. 2004-74814 discloses a human-carrying vehicle which has left and right coaxial drive wheels and which performs, to keep itself balanced in the front-back direction, attitude control and travel control by controlling the drive wheels according to the output of an attitude sensor. The vehicle is provided with an auxiliary wheel which contacts the ground in front of and/or at the rear of the driving wheels and an auxiliary wheel driving section which puts the auxiliary wheel out and in.

These vehicles use a coaxial two-wheeled mechanism with a small footprint. The coaxial two-wheeled mechanisms of these vehicles have a dynamic characteristic of a statically unstable inverted pendulum and are kept stably erected by dynamic attitude control. They can travel in a stable state making quick acceleration and deceleration by moving their gravity center.

Even though the conventional techniques disclosed in the Japanese Patent Laid-Open No. S63 (1988)-305082 and Japanese Patent Laid-Open No. 2003-271243 can improve the stability of a robot traveling forward or backward, they lack consideration for the stability of a robot which travels quickly making sharp turns. In other words, they include no measures against such problems as falling to a side on account of a centrifugal force generated when making a sharp turn, or slipping of the wheels on account of unbalanced ground reaction forces acting on the wheels and resultant failure of inverted pendulum control causing the robot to fall.

The conventional technique disclosed in the Japanese Patent Laid-Open No. 2004-74814 is for a two-wheeled mobile mechanism used as a vehicle to move a person. The vehicle is provided with a saddle to support a rider and a handlebar mechanism for the rider to hold. The handlebar mechanism has a passive degree of freedom to swing laterally. Such freedom to swing makes it easier for the rider of the vehicle to use, for example, when one of the wheels of the vehicle runs on an obstacle, his or her reflexes to keep his or her attitude stable in the lateral direction. Even though the technique disclosed in the Japanese Patent Laid-Open No. 2004-74814 makes up a means for stabilizing the vehicle attitude in the lateral direction, it is dependent on the rider's reflex movements. Therefore the technique cannot be said to provide a means for stabilizing and controlling the attitude in the lateral direction of an autonomous mobile robot which makes a two-wheeled travel using inverted pendulum control.

BRIEF SUMMARY OF THE INVENTION

An object of the present invention is to provide a mobile robot which can travel quickly making sharp turns in a stable state and whose footprint is small making the mobile robot suitable for use where human beings are present and a control method for the mobile robot.

To achieve the object, the present invention provides a mobile robot having a coaxial two-wheeled mobile mechanism which controls a forward thrust using inverted pendulum control. The mobile robot is further provided with a swing mechanism which actively swings an upper body laterally with respect to the mobile mechanism and a control unit which controls the swing mechanism. The control unit includes a sensing means for estimating a location of intersection of an extension of a composite vector of a centrifugal force and a gravitational force acting on the center of gravity of the mobile robot and a ground plane of wheels. The control unit controls a swing attitude so as to keep, based on an estimate made by the sensing means, the location of intersection in a prescribed area between left and right wheels.

In a more preferable concrete arrangement of the present invention, the control unit sets the prescribed area for the location of intersection approximately at a center between the left and right wheels and controls the swing attitude so as to keep the location of intersection in the prescribed area thus set.

The sensing means includes an acceleration sensor which measures accelerations in three directions, i.e., front-back direction, left-right direction and top-down direction and an inclination sensor which measures an attitude of the mobile mechanism with respect to the vertical direction. The control unit estimates, based on data measured by the acceleration sensor and the inclination sensor, a resultant acceleration vector of a gravitational acceleration acting on the center of gravity of the mobile robot and a centrifugal acceleration generated when the mobile robot makes a turn. The control unit then determines, based on the estimate thus made, a swing attitude angle.

The control unit estimates, based on pre-generated time-series data on travel locus curvature and travel speed, time-series data on a centrifugal acceleration acting on the center of gravity of the mobile robot. The control unit then generates, based on the estimate thus made, time-series data on the swing attitude angle, and controls the swing attitude by following the time-series data on the swing attitude angle thus generated in synchronization with travel control performed based on the time-series data on the travel locus curvature and the travel speed.

Furthermore, the sensing means includes an inclination sensor which is provided for the mobile mechanism and which measures an attitude of the mobile mechanism with respect to the vertical direction. The control unit corrects time-series data, which has been estimated for a travel on a level surface, on a centrifugal acceleration acting on the center of gravity of the mobile robot. The correction of the time-series data is made based on an inclination angle of a travel surface measured, by the inclination sensor while the mobile robot is traveling on the travel surface, in a direction lateral to the mobile robot and an attitude angle of a mobile mechanism with respect to a travel direction. Based on the correction thus made, the control unit estimates a resultant acceleration vector of a gravitational acceleration acting on the center of gravity of the mobile robot and a centrifugal acceleration generated when the mobile robot makes a turn. The control unit then determines, based on the estimate thus made, the swing attitude.

To achieve the object, the present invention provides a control method for a mobile robot having a coaxial two-wheeled mobile mechanism which controls a forward thrust using inverted pendulum control, a swing mechanism which actively swings an upper body laterally with respect to the mobile mechanism, and a control unit which controls the swing mechanism. The control method comprises the steps of estimating a location of intersection of an extension of a composite vector of a centrifugal force and a gravitational force acting on a center of gravity of the mobile robot and a ground plane of wheels by a sensing means provided for the control unit, and controlling, based on the estimate thus made, a swing attitude such that the location of intersection is kept in a prescribed area between left and right wheels. Furthermore, the prescribed area for the location of intersection is set approximately at a center between the left and right wheels, and the swing attitude is controlled such that the location of intersection is kept in the prescribed area thus set.

According to the present invention, the center of gravity of a robot, which has a coaxial two-wheeled mechanism and travels using inverted pendulum control, can be moved laterally by having the upper body of the robot autonomously swung and inclined. As a result, generation of a falling moment in a lateral direction of the robot attributable to a centrifugal force generated when a sharp turn is made or an inclination of the travel surface can be inhibited, so that the robot can travel always in a stable state. Thus, this technique can provide a mobile robot which can travel quickly making sharp turns in a stable state and whose footprint is small making the mobile robot suitable for use where human beings are present and a control method for the mobile robot.

BRIEF DESCRIPTION OF THE SEVERAL VIEWS OF THE DRAWINGS

FIGS. 1A to 7 are views of an embodiment of a mobile robot according to the present invention.

DETAILED DESCRIPTION OF THE INVENTION

A mobile robot and a control method therefor according to an embodiment of the present invention will be described in the following with reference to the accompanying drawings.

A mobile robot 1 according to the present embodiment has a coaxial two-wheeled mobile mechanism 2 which controls a forward thrust using inverted pendulum control. It is also provided with a swing mechanism 10 which laterally moves the center of gravity of the mobile robot 1 by actively swinging an upper body 3 laterally with respect to the mobile mechanism 2 and a control unit 11 which controls the mobile robot 1. The control unit 11 estimates, based on information provided by an acceleration sensor 9 and an attitude and direction sensor 8 included in the mobile mechanism 2, a composite vector of a centrifugal force and a gravitational force acting, when the mobile robot 1 makes a sharp turn or when the surface on which the mobile robot 1 is traveling is inclined, on the center of gravity of the mobile robot 1. Based on the estimate, the control unit 11 controls a swing attitude angle of the upper body 3 so as to keep the intersection (hereinafter referred to as the "ZMP" standing for Zero Moment Point) of an extension of the composite vector extending from the center of gravity of the mobile robot 1 and a ground plane of left and right wheels 4 and 5 in an area between the wheels 4 and 5. Doing so contributes to equalizing the ground reaction forces acting on the left and right wheels 4 and 5 and, thereby, to maintaining the attitude stability in the lateral direction of the mobile robot 1. In addition, doing so also reduces skidding of the wheels 4 and 5, so that the robustness of travel control made using inverted pendulum control is increased.

Figure 1A:
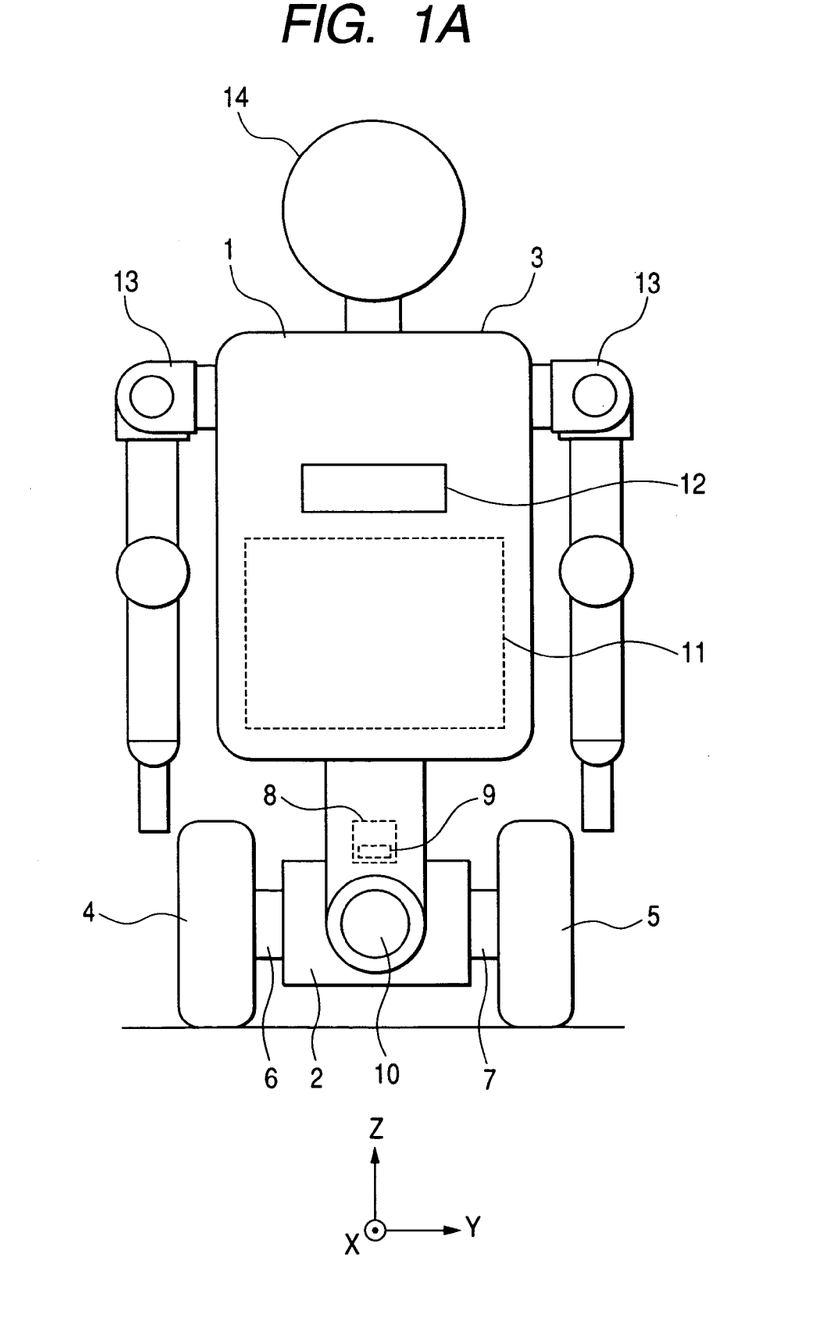
FIG. 1A is a front elevational view.
Figure 1B:
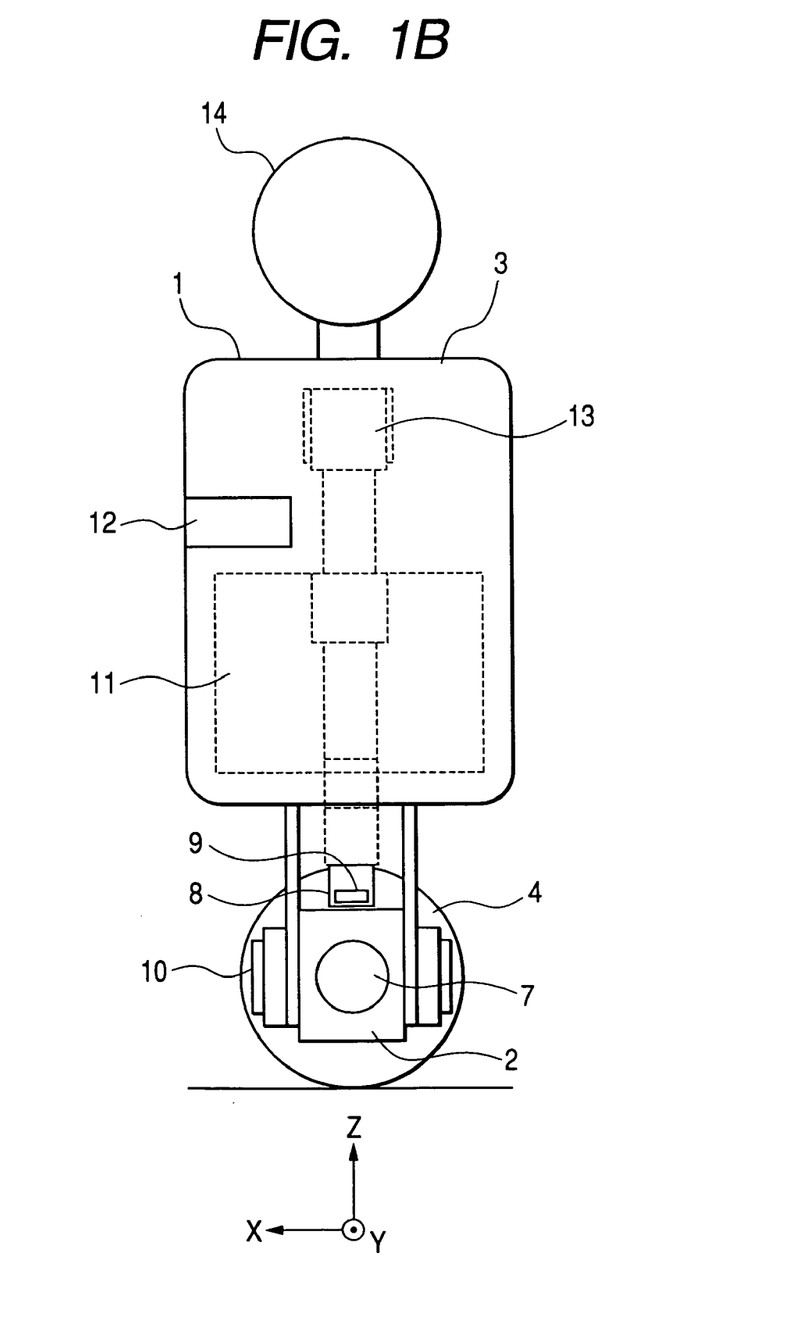
FIG. 1B is a side elevational view.

Next, an overall configuration of the mobile robot 1 will be described with reference to FIGS. 1A and 1B. FIGS. 1A and 1B are a front elevational view and a side elevational view, respectively, for describing the overall configuration of the mobile robot 1. In FIG. 1B, one of two manipulators 13 and the wheel 5 are not illustrated.

The mobile robot 1 is broadly divided into two parts: the mobile mechanism 2 and the upper body 3. The mobile mechanism 2 is provided with the left and right wheels 4 and 5, and driving motors 6 and 7 which drive the wheels 4 and 5, respectively. There are two sensors provided above the mobile mechanism 2. One is the three-axis acceleration sensor 9 that detects accelerations in the X, Y, and Z axis directions of the mobile mechanism 2. The other is the attitude and direction sensor 8 that detects the attitude with respect to the vertical direction and the direction about the vertical direction of the mobile mechanism 2. Such work devices as manipulators 13 and a head 14 having a human interface are attached to the upper body 3. The control unit 11 that controls the whole of the mobile robot 1 is built into the upper body 3. An obstacle sensor 12 which measures the locations and shapes of obstacles present in the travel direction in the travel area of the mobile robot 1 is provided on the upper body 3. The mobile mechanism 2 and the upper body 3 configured as described above are connected by the swing mechanism 10 having a rotational degree of freedom about the X axis. Position control by the swing mechanism 10 allows the attitude of the upper body 3 to be arbitrarily set with respective to the mobile mechanism 2.

Figure 2:
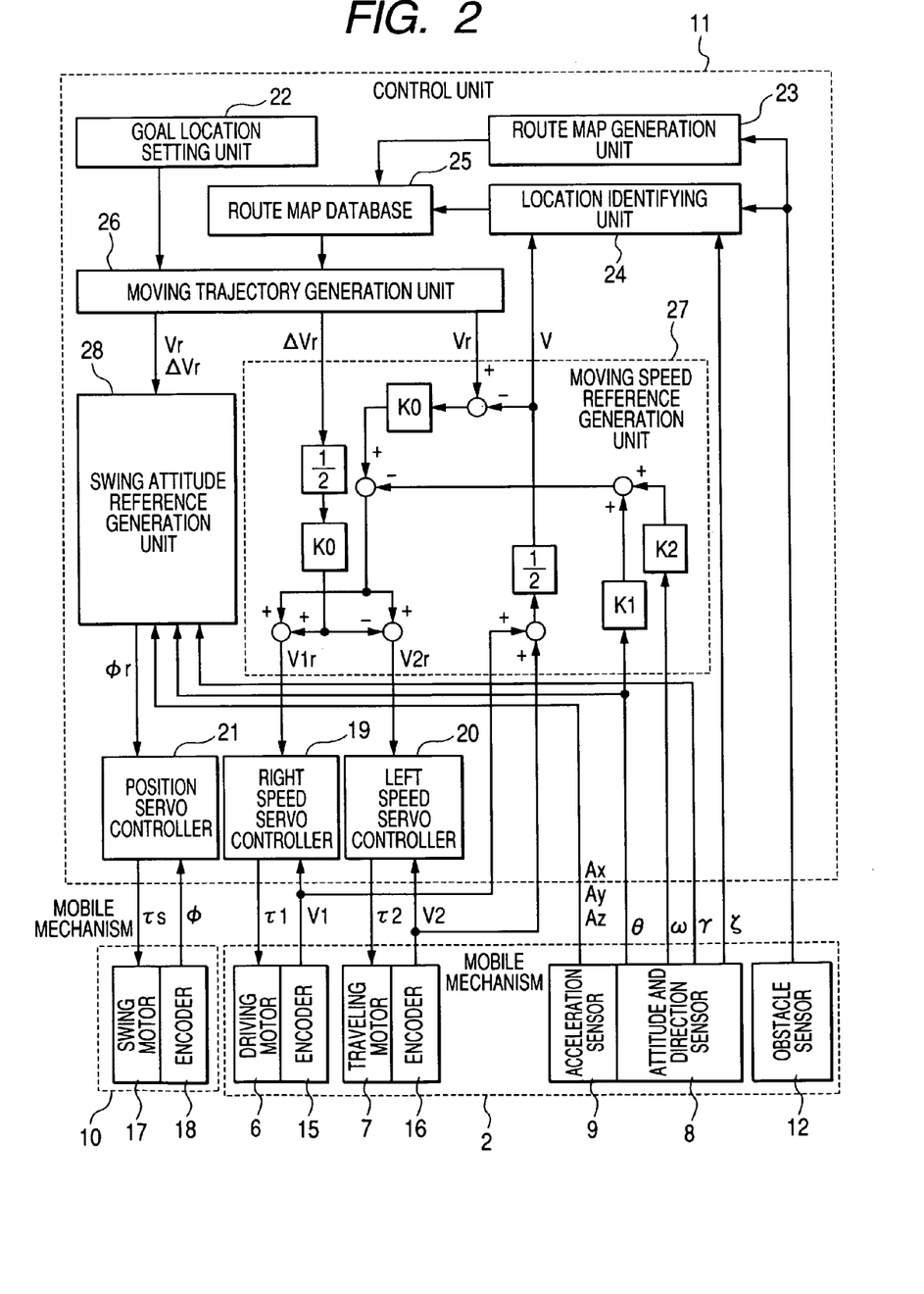
FIG. 2 is a block diagram of a control system of the mobile robot.

Next, the configuration of the control system of the mobile robot 1 will be described with reference to FIG. 2. FIG. 2 is a block diagram of the control system of the mobile robot 1 according to the present embodiment. In FIG. 2, those components which are also shown in FIG. 1A or 1B are denoted by the same reference numerals as in FIG. 1A or 1B.

A right speed servo controller 19 and a left speed servo controller 20 both of which are included in the control unit 11 drive the driving motors 6 and 7, respectively. They control the wheels 4 and 5 by following target speeds V1r and V2r, respectively. Speeds V1 and V2 of the wheels 4 and 5 are detected by encoders 15 and 16 associated with the driving motors 6 and 7, respectively. The speeds V1 and V2 detected are used for speed tracking control. They are also used as data for calculating a distance traveled. A position servo controller 21 included in the control unit 11 controls, by following the target position value $\phi r$, the attitude of the upper body 3 using a swing motor 17 of the swing mechanism 10 and an encoder 18 associated with it.

A moving speed reference generation unit 27 collects the attitude angle $\theta$ and associated angular speed $\omega$ measured by the attitude and direction sensor 8, and performs inverted pendulum control for the mobile mechanism 2. When the travel surface is inclined about the X axis by an inclination angle of $\gamma$, that is, when the mobile robot 1 is inclined laterally, the Y' axis and Z' axis of the coordinates of the mobile mechanism 2 rotate about the X axis by an inclination angle of $\gamma$ with respect to the Y axis that is horizontal and the Z axis that is vertical, respectively. The attitude angle $\theta$ is represented by the inclination angle about the Y' axis with respect to the Z' axis. The inclination angle $\gamma$ with respect to the Z axis that is vertical is measured by the attitude and direction sensor 8. In the moving speed reference generation unit 27, a target value for travel speed control is generated by calculating the deviation between the target speed Vr of the mobile mechanism 2 and the travel speed obtained as an average value of the speeds V1 and V2, multiplying the deviation thus obtained by gain K0, then subtracting, from the product thus obtained, the product of each of the attitude angle $\theta$ and the angular speed $\omega$ and gains K1 and K2. The target speeds V1r and V2r for the left and right wheels 4 and 5 are then generated by adding/subtracting one half of a target speed difference $\Delta V$ required when making a turn during a travel to/from the target straight-travel speed obtained as described above.

With the above arrangement, when gains K0, K1 and K2 are set appropriately, the control system works to make the travel speed follow the target speed Vr while also trying to bring the attitude angle $\theta$ and the angular speed $\omega$ close to 0, that is, trying to keep the attitude of the upper body 3 stable. By setting the target speed difference $\Delta V$ to an appropriate value other than 0, the speed difference between the left and right wheels 4 and 5 can be set as desired to make a desired turn during a travel.

In a swing attitude reference generation unit 28, a target value $\phi r$ for the swing attitude angle is generated based on information on the centrifugal acceleration that acts on the center of gravity of the mobile robot 1. In the swing attitude reference generation unit 28, two methods, being described later in detail, are used to generate the target value $\phi r$ for the swing attitude angle.

In the first method, the composite vector of the centrifugal acceleration and the gravitational acceleration that act on the center of gravity of the mobile robot 1 is estimated based on accelerations Ax, Ay and Az measured, by the acceleration sensor 9, on the coordinates of the mobile mechanism 2 and the attitude angle $\theta$ of the upper body 3 measured by the attitude and direction sensor 8. The target value $\phi r$ for the swing attitude angle is then calculated based on the composite vector thus estimated. The first method makes it possible, without knowing in advance the target speed Vr and the target speed difference $\Delta Vr$, to successively correct the swing attitude angle by following the traveling state of the mobile robot 1. The first method is therefore suitable for manipulatively controlling the mobile robot 1.

In the second method, a centrifugal acceleration is estimated for a travel on a horizontal plane using time-series data on the target speed Vr and the target speed difference $\Delta Vr$ determined based on a pre-generated travel locus. The centrifugal acceleration thus estimated is then corrected by calculation made taking into account the attitude angle $\theta$ of the upper body 3 and the attitude angle $\gamma$ about the X axis, corresponding to the angle of lateral inclination of the travel surface, that are measured by the attitude and direction sensor 8, and the composite vector of the centrifugal acceleration and the gravitational acceleration that act on the center of gravity of the mobile robot 1 is estimated. Based on the composite vector thus estimated, the target value $\phi r$ for the swing attitude angle is calculated. The second method enables the centrifugal acceleration to be estimated based on planned data. With this method, it is possible, in a stage of planning a travel locus, to determine such travel conditions which do not cause the swing attitude to get in a marginally controllable range. The second method is therefore suitable for an autonomous travel for which advance planning can be made based on information about travel circumstances grasped in advance.

A moving trajectory generation unit 26 is a control section higher-leveled than the control systems described above. The moving trajectory generation unit 26 generates a travel locus which enables the mobile robot 26 to travel, via a shortest possible route or in a shortest possible time, to a travel destination set by a goal location setting unit 22 while avoiding obstacles based on information given by a route map database 25, in which the current location of the mobile robot 1 existing in the travel area and the locations and shapes of obstacles also existing in the travel area are recorded. The moving trajectory generation unit 26 determines time-series data on the target speed Vr and the target speed difference $\Delta Vr$ based on the travel locus, and gives the time-series data to the moving speed reference generation unit 27 and the swing attitude reference generation unit 28 to control the travel of the mobile robot 1.

The current location and orientation of the mobile robot 1 that are recorded in the route map database 25 are generated in a location identifying unit 24. In the location identifying unit 24, the current location of the mobile robot 1 is cumulatively estimated based on the travel speed V obtained in the moving speed reference generation unit 27 and data on an orientation ξ detected by the attitude and direction sensor 8. Furthermore, by measuring, using the obstacle sensor 12, the locations and orientations of indicators for location identification in the travel area, the location identifying unit 24 highly accurately estimates the current location and orientation of the mobile robot 1 and periodically corrects the cumulatively estimated location and orientation of the mobile robot 1.

The locations and shapes of obstacles that are recorded in the route map database 25 are generated in a route map generation unit 23. In the route map generation unit 23, obstacles present in the travel area are identified based on distance information on obstacles detected by the obstacle sensor 12, then the locations and shapes of areas where the obstacle are present are estimated.

Figure 3:
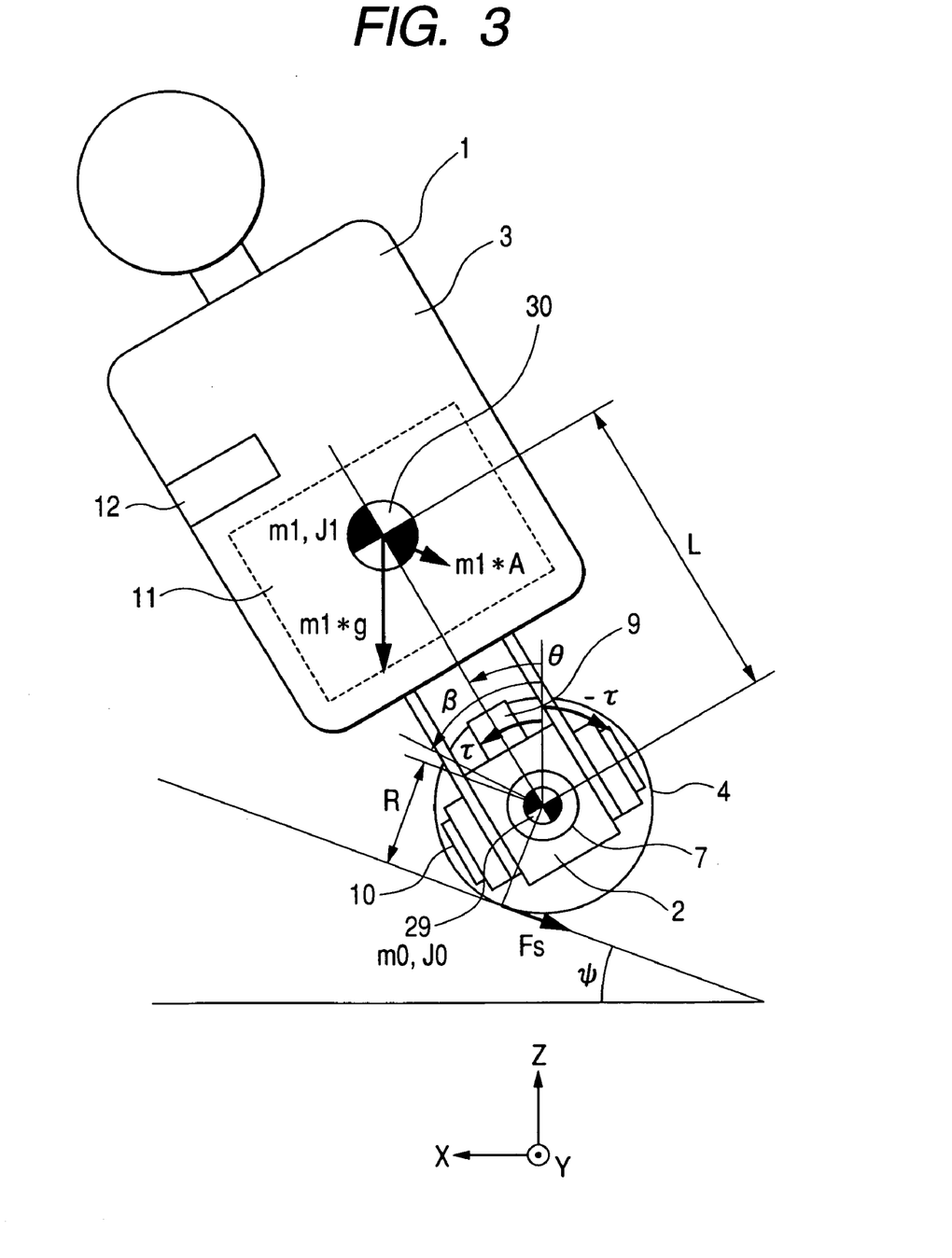
FIG. 3 is a diagram for explaining travel motion.

Next, traveling motion of the mobile robot 1 based on inverted pendulum control will be described with reference to FIG. 3. FIG. 3 shows the mobile robot 1 steadily traveling on a travel surface with an inclination angle of ψ. In FIG. 3, the inclination γ about the X axis of the travel surface is assumed to be 0 for the sake of simplification.

Dynamic characteristics of a simplified model composed of a center of gravity 29 of a rotating portion linked to the wheels 4 and 5 and a center of gravity 30 of other portions combined will be evaluated below. It is assumed that a mass m0 concentrates on the gravity of center 29, that there is an inertia moment J0 whose center of rotation is the mass m0, that a mass m1 concentrates on the gravity of center 30, and that there is an inertia moment J1 whose center of rotation is the mass J1. The distance between the centers of gravity 29 and 30 is represented by L. The radius of each of the wheels 4 and 5 is represented by R. The rotation angle of each of the wheels 4 and 5 with respect to the vertical direction is represented by β. The inclined attitude angle of the mobile robot 1 is represented by θ. When the center of gravity 29 is at (x0, z0) and the center of gravity 30 is at (x1, z1), they can be formulated into equation (1) and equation (2), respectively. Based on the equations (1) and (2), a kinetic energy J and a potential energy U of the mobile robot 1 are expressed by equations (3) and (4), respectively. Based on these equations, equation (5) can be obtained, using Lagrange's equation, as a dynamic equation of the mobile robot 1.

$$\begin{cases} x_0 = R\beta\cos\psi \\ z_0 = R\beta\sin\psi \end{cases} \quad (1)$$

$$\begin{cases} x_1 = x_0 + L\sin\theta \\ z_1 = z_0 + L\cos\theta \end{cases} \quad (2)$$

$$J = \frac{m_0}{2}(\dot{x}_0^2 + \dot{z}_0^2) + \frac{m_1}{2}(\dot{x}_1^2 + \dot{z}_1^2) + \frac{J_0}{2}\dot{\beta}^2 + \frac{J_1}{2}\dot{\theta}^2 \quad (3)$$

$$= \frac{1}{2}[(J_0 + MR^2)\dot{\beta}^2 + (J_1 + m_1 L^2)\dot{\theta}^2] + 2m_1 RL\cos(\theta + \psi)\dot{\beta}\dot{\theta}$$

$$U = g(m_0 z_0 + m_1 z_1) = g(m_1 L\cos\theta + MR\beta\sin\psi) \quad (4)$$

$$\tau - F_s R = \frac{d}{dt}\left(\frac{\partial J}{\partial \dot{\beta}}\right) - \frac{\partial J}{\partial \beta} + \frac{\partial U}{\partial \beta} \quad (5)$$

$$= (J_0 + MR^2)\ddot{\beta} + m_1 RL\cos(\theta + \psi)\ddot{\theta} +$$

$$m_1 RL\sin(\theta + \psi)\dot{\theta}^2 + MRg\sin\psi - \tau$$

$$= \frac{d}{dt}\left(\frac{\partial J}{\partial \dot{\theta}}\right) - \frac{\partial J}{\partial \theta} + \frac{\partial U}{\partial \theta}$$

$$= m_1 RL\cos(\theta + \psi)\ddot{\beta} + (J_1 + m_1 L^2)\ddot{\theta} +$$

$$m_1 RL\sin(\theta + \psi)\dot{\theta}^2 - m_1 Lg\sin\theta$$

where τ is a travel drive torque and Fs is a travel resistance.

Based on the dynamic equation (equation (5)), conditions for enabling a steady travel as shown in FIG. 3 will be studied below. In a state of steady travel, the attitude of the mobile robot 1 is stabilized without moving, so that θ' and θ" both become 0. By substituting this condition into equation (5), equation (5) can be rearranged into equation (6). When the thrust acceleration parallel to the travel surface is represented by A, equation (7) is obtained. By substituting equation (7) into equation (6) and rearranging equation (6), equation (8) which can give the attitude angle θ in a state of steady travel can be obtained.

$$-m_1 RL\cos(\theta + \psi)\ddot{\beta} + m_1 Lg\sin\theta = (J_0 + MR^2)\ddot{\beta} + MRg\sin\psi + F_s R \quad (6)$$

$$R\ddot{\beta} = A \quad (7)$$

$$\theta = \sin^{-1}\left(\frac{(J_0 + MR^2)A + MR^2 g\sin\psi + F_s R^2}{m_1 LR\sqrt{A^2 + g^2 + 2gA\sin\psi}}\right) + \tan^{-1}\left(\frac{A\cos\psi}{A\sin\psi + g}\right) \quad (8)$$

As shown in equation (8), a state of steady travel is maintained while the gravitational torque generated by an inclination of the attitude angle θ and a drive torque, which is attributable to the sum of a kinetic reaction associated with a translational acceleration over a travel surface, a drag against gravity needed to stay on an inclined travel surface and a travel resistance, are balanced. Therefore, when accelerating forwardly or when climbing an inclined surface, the mobile robot 1 travels assuming a forwardly inclined position. Even when traveling at a constant speed on a level surface, it assumes a slightly forwardly inclined position to cope with the travel resistance. For a deceleration, it assumes a rearwardly inclined position to apply a brake.

Figure 4:
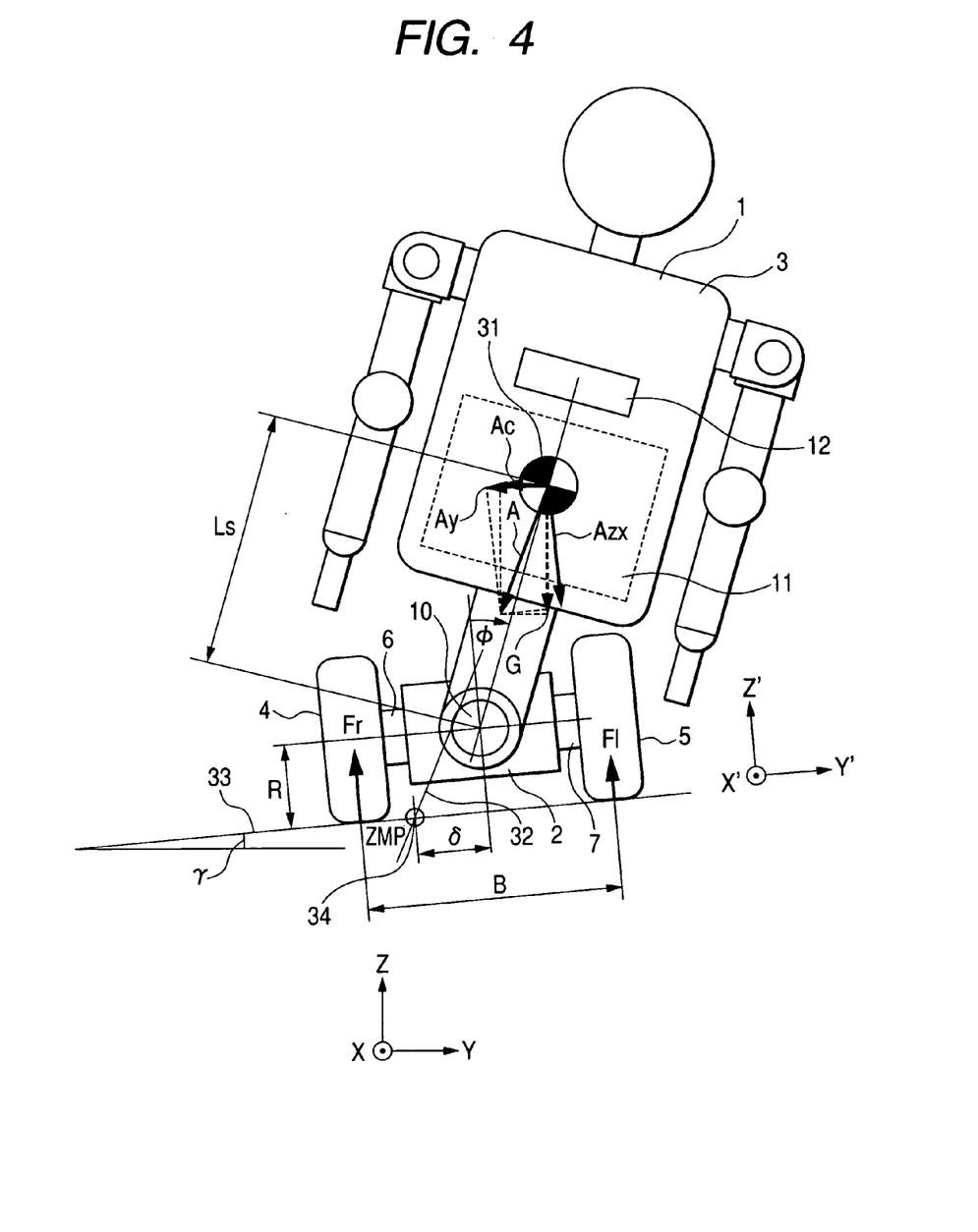
FIG. 4 is a diagram for explaining swing angle control.

Next, with reference to FIG. 4, operation of the swing mechanism 10 to keep the attitude in the lateral direction of the mobile robot 1 stable will be explained. FIG. 4 is a front view of the mobile robot 1 with its attitude angle θ being 0.

It is assumed that a center of gravity 31 of the whole of the mobile robot 1 is apart by a distance Ls from the rotational center of the swing mechanism 10 lying on the midline of the mobile robot 1. Acceleration vectors obtained by decomposing a composite vector A of a centrifugal acceleration vector Ac and a gravitational acceleration vector G acting on the center of gravity 31 by projection onto X'Y' and X'Z' planes of coordinates (X', Y', Z') of the mobile mechanism 2 are represented by Ay and Azx, respectively. The acceleration vector Ay can be measured directly by the acceleration sensor 9. The value of Azx can be calculated by equation (9) using the values of Ax and Az measured by the acceleration sensor 9 and the attitude angle θ measured by the attitude and direction sensor 8.

$$Axz = Ax \sin θ + Az \cos θ \qquad (9)$$

The intersection of an extension 32 of the composite vector A of the accelerations Ay and Azx and a travel surface 33 is denoted as a ZMP 34. Now, assume that the distance along the Y axis between the ZMP 34 and the center of the mobile mechanism 2 is δ and that the distance between the wheels 4 and 5 is B. At the ZMP 34, the moment of rotation about the X axis is 0. When the ZMP 34 is outside the wheel 4 or the wheel 5, that is, when a condition 'δ<−B/2' or 'B/2<δ' is met, the mobile robot 1 falls on the side where the ZMP 34 is located. To maintain the attitude of the mobile robot 1 stable, therefore, the ZMP 34 is required to be between the wheels 4 and 5. Namely, a condition '−B/2≦δ≦B/2' requires to be met. Also, to enable stable inverted pendulum control, it is necessary to reduce, as much as possible, slipping of the wheels 4 and 5. When, in a sharp turn, the ground reaction forces acting on the wheels 4 and 5 become notably unbalanced, slipping of the wheel receiving a smaller ground reaction force than the other increases and inverted pendulum control becomes less stable. Such a state is not desirable since turning motion can become unstable. It is, therefore, necessary, even when making a turn, to keep ground reaction forces Fr and Fl against the wheels 4 and 5 nearly equal. It is, for this reason, necessary to keep the value of δ as close to 0 as possible. As a measure in line with the above requirement, the swing mechanism 10 inclines the upper body 3 by the swing angle φ so as to shift the center of gravity 31, cause the condition '−B/2≦δ≦B/2' to be met and bring the value of δ close to 0. Equation (10) is for extracting the value of δ. The equation takes into account the geometric condition associated with the inclination of the whole of the mobile robot 1 by the attitude angle θ that is omitted in FIG. 4. Equation (11) for calculating the swing angle φ is obtained from equation (10).

$$\delta = (L_s \cos\theta\cos\phi + R)\frac{Ay}{Axz} - L_s \sin\phi \qquad (10)$$

$$\phi = \sin^{-1}\left(\frac{RAy - \delta Axz}{L_s\sqrt{Axz^2 + Ay^2\cos^2\theta}}\right) + \tan^{-1}\left(\frac{Ay\cos\theta}{Axz}\right) \qquad (11)$$

In the swing attitude reference generation unit 28 shown in FIG. 2, the target value φr for the swing attitude angle is calculated using equations (9) and (11). In the previously described first method for generating the target value φr for the swing attitude angle, the target value is directly determined using equation (9) and based on real-time information provided by the acceleration sensor 9.

Figure 5:
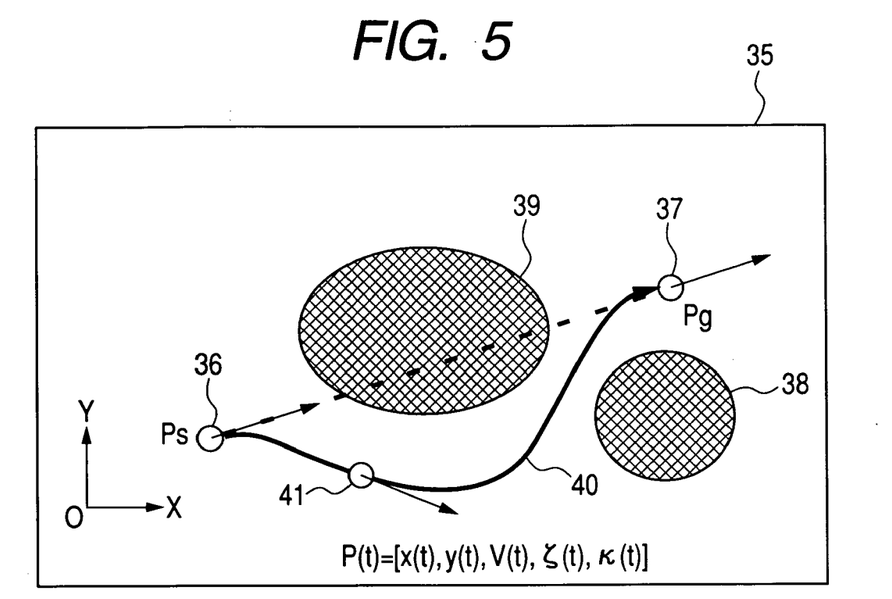
FIG. 5 is a diagram for explaining a process of generating a travel locus.

Next, how to concretely implement the second method will be described. FIG. 5 schematically shows a process of generating a travel locus 40 in the moving trajectory generation unit 26. In a travel map 35, areas where obstacles 38 and 39 are present are recorded. A starting point Ps36 is determined based on information given by the location identifying unit 24. The starting point Ps 36 includes information on the current location and the current orientation. Similarly, a goal point Pg 37 is determined based on information given by the goal location setting unit 22. The goal point Pg 37 includes information on the goal location and the orientation at the goal. Based on these premises, the travel locus 40 leading from the starting point Ps 36 to the goal point Pg 37 will be determined complying with target norms, for example, for collision avoidance between the obstacles 38 and 39 and the mobile robot 1, a shortest travel time, and a shortest travel distance.

The methods that can be used to generate the travel locus 40 include one in which circular and linear loci are used in combination and one in which polynomial curves such as Bezier curves and quadratic B-spline curves are used. First, a curve profile which enables avoidance of the obstacles 38 and 39 will be determined. Next, transitions in the travel speed at which to travel following the travel locus 40 will be determined. For example, it may be determined, as a simple norm, to travel an entire travel path at a constant speed. Or, when occurrence of an excessive centrifugal force is feared with the travel path including a turn with a large curvature, an appropriate deceleration pattern may be set. Patterns for acceleration at the start of traveling and for deceleration at the end of traveling are set. Through these steps, the travel locus 40 is determined as a time function of location. Subsequently, travel locus time-series data P(t) 41 is determined. The time-series data P(t) 41 is obtained by calculating speed V(T), travel direction ξ(t), and travel locus curvature κ(t) using equation (12) and based on determined location data [x(t), y(t)].

$$\begin{cases} V = \sqrt{\dot{x}^2 + \dot{y}^2} \\ \xi = \tan^{-1}\left(\frac{\dot{y}}{\dot{x}}\right) \\ \kappa = \frac{\dot{x}\ddot{y} - \ddot{x}\dot{y}}{(\dot{x}^2 + \dot{y}^2)^{\frac{3}{2}}} \end{cases} \qquad (12)$$

The moving speed reference generation unit 27 is given steering control targets using the speed difference ΔV. The speed difference ΔV is calculated as a function of the curvature κ(t) and speed V(T) as being described below.

Figure 6:
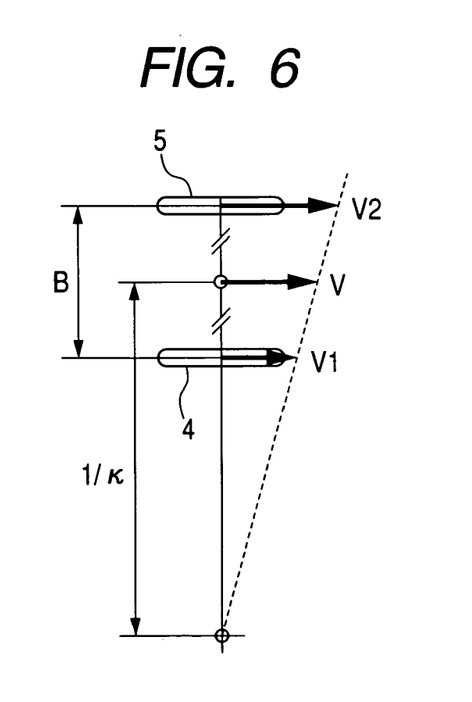
FIG. 6 is a diagram for explaining turning motion.

FIG. 6 shows a model of turning motion in a two-wheeled travel. When there is a constant speed difference between the wheels 4 and 5, turning is made with a constant curvature. When the speeds of the wheels 4 and 5 are V1 and V2, respectively, the speed difference between them is ΔV, and their average speed is V, the extraction of the speed difference ΔV associated with the curvature κ and average speed V can be formulated into equation (16) based on equations (13), (14) and (15).

$$\Delta V = V_2 - V_1 \qquad (13)$$

$$V = \frac{(V_2 + V_1)}{2} \qquad (14)$$

$$\frac{V_2}{V_1} = \frac{\frac{1}{\kappa} + \frac{B}{2}}{\frac{1}{\kappa} - \frac{B}{2}} \qquad (15)$$

$$\Delta V = B\kappa V \qquad (16)$$

In the swing attitude reference generation unit 28, accelerations Ay and Axz are obtained by first determining the centrifugal acceleration Ac for a turning travel on a level surface using equation (17) and then calculating equation (18) based on the inclination angle γ of the travel surface measured by the attitude and direction sensor 8.

$$A_c = V^2\kappa = \frac{V\Delta V}{B} \quad (17)$$

$$\begin{cases} A_y = g\sin\gamma + A_c\cos\gamma \\ A_{xz} = g\cos\gamma - A_c\sin\gamma \end{cases} \quad (18)$$

As described above, in the second method, the target speed Vr and the target speed difference ΔVr are extracted from the time-series data P(t) 41 for the travel locus 40 generated in the moving trajectory generation unit 26, accelerations Ay and Axz are estimated using equations (17) and (18), and the target value φr for the swing attitude angle is calculated using equation (11).

Figure 7:
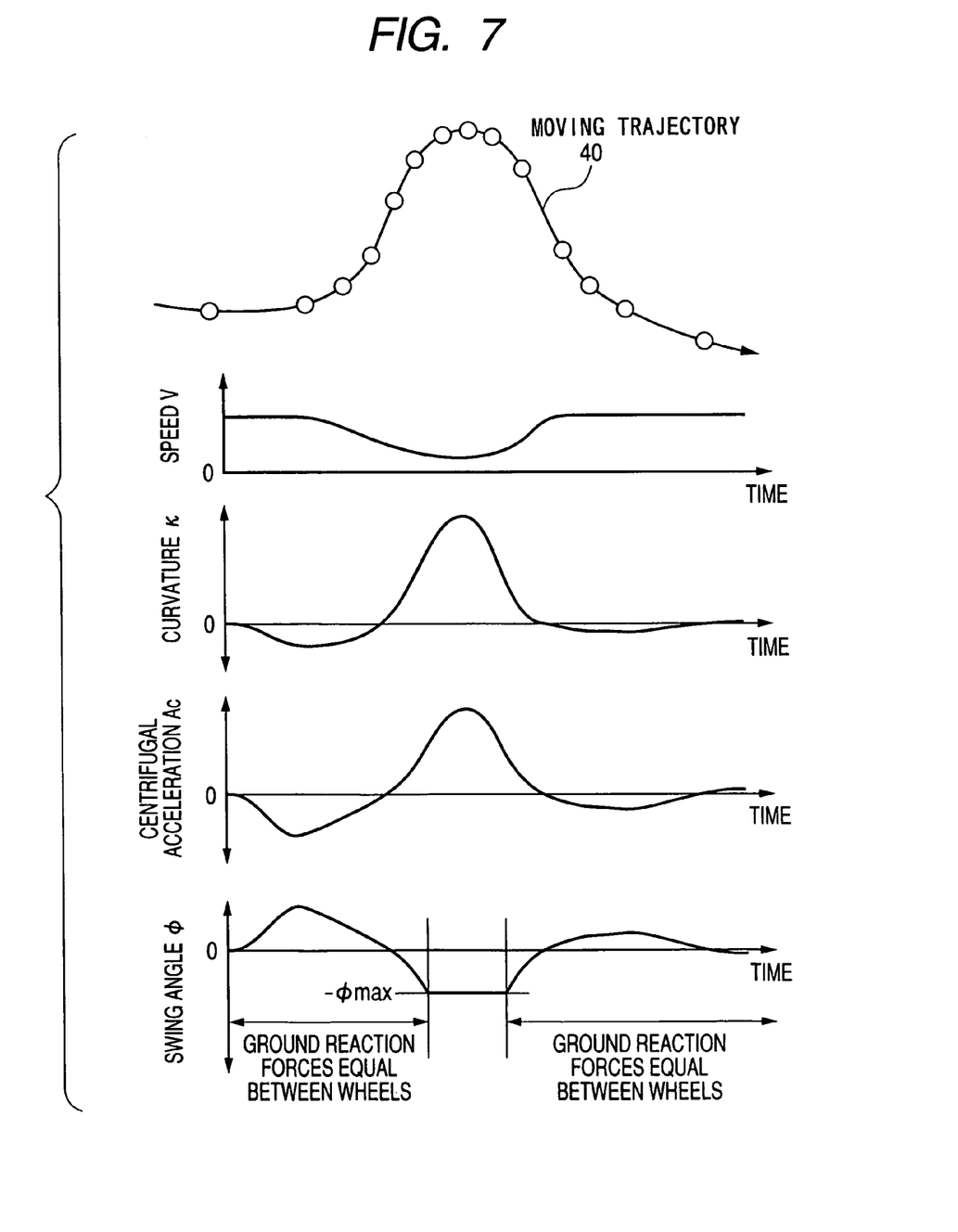
FIG. 7 is a diagram for explaining a process of generating a swing angle.

FIG. 7 shows an example process for generating the swing angle φ. The circles shown on the travel locus 40 indicate passage points at equal time intervals. In this example, a pattern for curbing the speed V at a sharp turn is formed. When the peak value of the curvature κ is excessively large, the speed V is reduced. The centrifugal acceleration Ac is, as described above, estimated using equation (17) and based on the speed V and the curvature κ. The swing angle f is calculated using equation (11). In the present example, it is controlled aiming at keeping a state of 'δ=0', that is, equalizing the ground reaction forces acting on the left and right wheels with the ZMP located in the center between the two wheels. As shown in FIG. 7, when the swing angle φ calculated using equation (11) is outside the swing angle control range (−φ max<φ<φ max) of the swing mechanism 10, the mobile robot 1 is made to travel with the maximum swing angle without getting outside the range of '−B/2≦δ≦B/2' in which the mobile robot 1 can be kept stable. In the second method, the time-series pattern of the travel locus 40 can be arbitrarily set in advance. It is, therefore, possible to re-plan the travel locus 40 so as to keep the swing angle φ within the swing angle control range.

According to the present embodiment, the centrifugal acceleration acting on the mobile robot 1 can be estimated, the centrifugal acceleration being dependent on the travel speed of the mobile mechanism traveling using inverted pendulum control and the speed difference between the left and right wheels. It is also possible to estimate the location of the ZMP that is projected on the travel surface based on the estimated centrifugal acceleration and the value of a lateral component of the gravitational acceleration attributable to an inclination of the travel surface detected by the attitude and direction sensor 8 and the acceleration sensor 9. Furthermore, as the swing mechanism 4 moves the center of gravity of the mobile robot 1 laterally to keep the ZMP in the area between the left and right wheels, the mobile robot 1 can travel in a stable state without falling to a side even when a centrifugal force is generated when making a turn or even when the travel surface is inclined. Still furthermore, by controlling the swing angle of the swing mechanism 4 so as to keep the ZMP around the center between the left and right wheels 4 and 5, the ground reaction forces acting on the left and right wheels 4 and 5 can be kept approximately equal. This reduces slipping of the wheels 4 and 5 and enhances the reliability of traveling of the mobile robot 1 using inverted pendulum control.

What is claimed is:

1. A mobile robot comprising:
a coaxial two-wheeled mobile mechanism having left and right wheels, which controls a forward thrust using inverted pendulum control;
an upper body connected to an upper portion of the mobile mechanism;
a swing mechanism which actively swings the upper body laterally with respect to the mobile mechanisms; and
a control unit which controls the swing mechanism,
wherein the control unit includes sensing means for estimating a location of intersection of an extension of a composite vector of a centrifugal force and a gravitational force acting on a center of gravity of the mobile robot and a ground plane of left and right wheels of the mobile mechanism, and controls a swing attitude angle of the upper body so as to keep, based on an estimate made by the sensing means, the location of intersection around a center laterally between the left and right wheels.

2. The mobile robot according to claim 1, wherein:
the sensing means includes an acceleration sensor which measures accelerations in a front-back direction, a left-right direction and a top-down direction, and an inclination sensor which measures an attitude of the mobile mechanism with respect to a vertical direction; and
the control unit estimates, based on data measured by the acceleration sensor and the inclination sensor, a resultant acceleration vector of a gravitational acceleration acting on the center of gravity of the mobile robot and a centrifugal acceleration generated when the mobile robot makes a turn, and determines, based on the estimate, the swing attitude angle.

3. The mobile robot according to claim 1, wherein:
the sensing means includes an acceleration sensor which measures accelerations in a front-back direction, a left-right direction and a top-down direction, and an inclination sensor which measures an attitude of the mobile mechanism with respect to a vertical direction; and
the control unit estimates, based on data measured by the acceleration sensor and the inclination sensor, a resultant acceleration vector of a gravitational acceleration acting on the center of gravity of the mobile robot and a centrifugal acceleration generated when the mobile robot makes a turn, and determines, based on the estimate, the swing attitude angle.

4. A mobile robot comprising:
a coaxial two-wheeled mobile mechanism having left and right wheels;
an upper body connected to an upper portion of the mobile mechanism;
a swing mechanism which actively swings the upper body laterally with respect to the mobile mechanism; and
a control unit which controls the swing mechanism,
wherein the control unit includes sensing means for estimating a location of intersection of an extension of a composite vector of a centrifugal force and a gravitational force acting on a center of gravity of the mobile robot and a ground plane of left and right wheels of the mobile mechanism, and controls a swing attitude so as to keep, based on an estimate made by the sensing means, the location of intersection in a prescribed area between the left and right wheels, and
wherein the control unit is further configured to:
estimate, based on pre-generated time-series data on a travel locus curvature and a travel speed, time-series data on a centrifugal acceleration acting on the center of gravity of the mobile robot;
generate, based on the estimate, time-series data on the swing attitude angle; and
control the swing attitude by following the time-series data on the swing attitude angle in synchronization with travel control performed based on the time-series data on the travel locus curvature and the travel speed.

5. The mobile robot according to claim 4:
wherein the sensing means includes an inclination sensor which measures an attitude of the mobile mechanism with respect to a vertical direction; and
wherein the control unit is further configured to:
  correct time-series data on a centrifugal acceleration acting on the center of gravity of the mobile robot, the time-series data having been estimated for a travel on a level surface and the correction being made based on an inclination angle of a travel surface measured, by the inclination sensor while the mobile robot is traveling on the travel surface, in a direction lateral to the mobile robot and an attitude angle of the mobile mechanism with respect to a travel direction,
  estimate, based on the correction, a resultant acceleration vector of a gravitational acceleration acting on the center of gravity of the mobile robot and a centrifugal acceleration generated when the mobile robot makes a turn, and
  determine, based on the estimate, the swing attitude.

6. A mobile robot comprising:
a coaxial two-wheeled mobile mechanism having left and right wheels;
an upper body connected to an upper portion of the mobile mechanism;
a swing mechanism which actively swings the upper body laterally with respect to the mobile mechanism; and
a control unit which controls the swing mechanism,
wherein the control unit includes sensing means for estimating a location of intersection of an extension of a composite vector of a centrifugal force and a gravitational force acting on a center of gravity of the mobile robot and a ground plane of left and right wheels of the mobile mechanism, and controls a swing attitude so as to keep, based on an estimate made by the sensing means, the location of intersection around a center laterally between the left and right wheels, and
wherein the control unit is further configured to:
  estimate, based on pre-generated time-series data on a travel locus curvature and a travel speed, time-series data on a centrifugal acceleration acting on the center of gravity of the mobile robot;
  generate, based on the estimate time-series data on swing attitude angle; and
  control the swing attitude by following the time-series data on the swing attitude angle in synchronization with travel control performed based on the time-series data on the travel locus curvature and the travel speed.

7. The mobile robot according to claim 6:
wherein the sensing means includes an inclination sensor which measures an attitude of the mobile mechanism with respect to a vertical direction; and
wherein the control unit is further configured to:
  correct time-series data on a centrifugal acceleration acting on the center of gravity of the mobile robot, the time-series data having been estimated for a travel on a level surface and the correction being made based on an inclination angle of a travel surface measured, by the inclination sensor while the mobile robot is traveling on the travel surface, in a direction lateral to the mobile robot and an attitude angle of the mobile mechanism with respect to a travel direction,
  estimate, based on the correction, a resultant acceleration vector of a gravitational acceleration acting on the center of gravity of the mobile robot and a centrifugal acceleration generated when the mobile robot makes a turn, and
  determine, based on the estimate, the swing attitude.

8. A control method for a mobile robot comprising a coaxial two-wheeled mobile mechanism having left and right wheels which controls a forward thrust using inverted pendulum control, an upper body connected to an upper portion of the mobile mechanism, a swing mechanism which actively swings an upper body laterally with respect to the mobile mechanism, and a control unit which controls the swing mechanism and the control method comprising:
  estimating a location of intersection of an extension of a composite vector of a centrifugal force and a gravitational force acting on a center of gravity of the mobile robot and a ground plane of the left and right wheels; and
  controlling, based on the estimate thus made, a swing attitude angle of the upper body so as to keep the location of intersection around a center laterally between left and right wheels.

* * * * *